(12) United States Patent
Blacklin

(10) Patent No.: US 9,010,812 B2
(45) Date of Patent: Apr. 21, 2015

(54) REACTION VESSEL PROBE ADAPTER

(75) Inventor: Peter Alfred Blacklin, Columbia, MD (US)

(73) Assignee: Mettler-Toledo AutoChem, Inc., Columbia, MD (US)

(*) Notice: Subject to any disclaimer, the term of this patent is extended or adjusted under 35 U.S.C. 154(b) by 399 days.

(21) Appl. No.: 13/414,091

(22) Filed: Mar. 7, 2012

(65) Prior Publication Data

US 2013/0233098 A1 Sep. 12, 2013

(51) Int. Cl.
| F16L 3/04 | (2006.01) |
| B01J 3/03 | (2006.01) |
| F16J 15/02 | (2006.01) |
| G01D 11/30 | (2006.01) |

(52) U.S. Cl.
CPC ........ *B01J 3/03* (2013.01); *F16J 15/028* (2013.01); *G01D 11/30* (2013.01)

(58) Field of Classification Search
CPC ............ F16L 21/06; F16L 3/04; F16J 15/028
USPC ............. 285/136.1, 142.1, 139.2, 139.3, 323, 285/324; 174/12 R, 12 BH
See application file for complete search history.

(56) References Cited

U.S. PATENT DOCUMENTS

| 5,357 A * | 11/1847 | Allen et al. ................... 285/342 |
| 9,239 A | 8/1852 | Winshin |
| 91,007 A | 6/1869 | Fowler |
| 148,285 A | 3/1874 | Cornelius |
| 259,449 A | 6/1882 | Woodring et al. |
| 752,452 A | 2/1904 | Hohmann |
| 1,460,105 A | 6/1923 | Malone |
| 1,762,721 A | 6/1930 | Klingner |
| 2,215,476 A * | 9/1940 | Peters ........................... 285/342 |
| 2,517,705 A | 8/1950 | Paquin |
| 2,727,763 A | 12/1955 | Ziep |
| 2,749,154 A | 6/1956 | Smith |
| 3,142,500 A * | 7/1964 | Wesseler ....................... 285/342 |
| 3,179,448 A | 4/1965 | Jones |
| 3,323,874 A | 6/1967 | Phillips |
| 3,544,281 A | 12/1970 | Phillips |
| 3,695,640 A | 10/1972 | Clague |
| 3,695,642 A | 10/1972 | DeWoody |
| 3,852,512 A | 12/1974 | Herrmann, Jr. |

(Continued)

FOREIGN PATENT DOCUMENTS

| EP | 0838666 A1 | 4/1998 |
| FR | 2909434 A3 | 6/2008 |

(Continued)

*Primary Examiner* — David E Bochna
(74) *Attorney, Agent, or Firm* — Standley Law Group LLP

(57) ABSTRACT

An adapter for releasably securing a probe to a reaction vessel. Embodiments of the adapter include a cover plate for mating with a reaction vessel, a body portion extending from the cover plate, and a probe gripping portion secured to the body portion. A collet and at least one anvil resides within the body portion/probe gripping portion assembly. The collet has at least one split conical end that may be divided into a plurality of flexible gripping fingers, the conical end of the collet adapted to mate with the at least one anvil. An o-ring is preferably located in the body portion and surrounds a probe when the probe is passed through the adapter. Pressure from the reaction vessel exerts an axial force on the o-ring which, in turn, exerts a like force on the anvil, thereby causing the gripping fingers of the collet to exert a gripping force on the probe.

25 Claims, 6 Drawing Sheets

(56) References Cited

U.S. PATENT DOCUMENTS

| | | | |
|---|---|---|---|
| 4,354,731 A | 10/1982 | Mouissie | |
| 4,669,763 A | 6/1987 | Phillips | |
| 4,679,895 A | 7/1987 | Huber | |
| 4,846,970 A | 7/1989 | Bertelsen et al. | |
| 4,886,304 A | 12/1989 | Kunsman | |
| 5,234,235 A * | 8/1993 | Worden | 285/342 |
| 6,102,449 A * | 8/2000 | Welsh | 285/342 |
| 6,321,021 B1 | 11/2001 | Cairns et al. | |
| 7,735,878 B2 * | 6/2010 | Keene | 285/342 |
| 2001/0022886 A1 | 9/2001 | Cairns et al. | |
| 2008/0166099 A1 | 7/2008 | Dunphy et al. | |

FOREIGN PATENT DOCUMENTS

| | | |
|---|---|---|
| GB | 2060197 A | 4/1981 |
| GB | 2427911 A | 1/2007 |
| WO | 86/01610 A | 3/1986 |
| WO | 01/16460 A1 | 3/2001 |

* cited by examiner

REACTION VESSEL PROBE ADAPTER

TECHNICAL FIELD

The present invention is directed to an adapter for coupling a probe to a reaction vessel in a sealed manner.

BACKGROUND

There are a number of applications and processes that involve the monitoring of a reaction taking place within a reaction vessel. In a most simplistic application, this may involve the reaction of some number of reactants in a single reaction vessel. In more complex applications, such as combinatorial chemistry and/or other high throughput screening applications, a number of reactions involving a number of different reactants may take place simultaneously within a multitude of different reaction vessels.

The monitoring of a reaction frequently involves inserting a substantially cylindrical or tubular probe into the reaction vessel within which the reaction of interest is taking place. Such probes may be associated with various monitoring devices such as, for example, Fourier transform infrared spectroscopy (FTIR) devices that facilitate the observation of reaction initiation and endpoint, reaction progression, etc., and focused beam reflectance measurement (FBRM®) devices that permit real-time in situ particle system characterization.

In any event, the insertion of a probe into a reaction vessel typically requires that the probe-vessel interface be sealed against leakage. This can be difficult because the probe is often exposed to pressure forces resulting from the head of liquid within the reaction vessel or from the pressurization of the reaction vessel as part of or as a result of the reaction experiment. These pressure forces will frequently tend to expel the probe from the reaction vessel if some means of axially restraining the probe is not provided. Axial restraint of the probe may be complicated, however, by the fact that it commonly desirable to mount the probe in a manner that allows for adjustment of its insertion depth into the reaction vessel.

Various methods of securing a probe to a reaction vessel are known, but all of these methods have their shortcomings. For example, one known method of securing a probe to a reaction vessel are involves the use of a specialized Swagelok® coupling system. This system employs a ferrule that is placed over a probe and compressed, thereby securing the ferrule to the probe. Undesirably, this typically results in the ferrule being permanently attached to the exterior of the probe due to yielding of the probe material beyond its compressive limit. Attachment of the ferrule in this manner also prevents any adjustability of the insertion depth of the probe into a reaction vessel.

Clamping the probe is then typically accomplished by means of a clamp comprised of heavy-wall, axially split tubing that is secured around the probe with a number of screws or bolts. This clamping method may perform satisfactorily when the outer diameter of the probe and the inner bore of the tubing is closely matched in dimension. However, the outer diameter of typical probes will vary within some tolerance range and, therefore, the inner bore of a clamp to be used with these probes is normally machined to a diameter that will allow the largest possible probe diameter to be acceptably secured within a clamp of minimum bore diameter. Since it is machined, the inner clamp bore also has some dimensional tolerance range. One result of this known clamping method is that when a probe of minimum outer diameter is secured within a clamp having a maximum inner bore diameter, the probe is often truly clamped along only two surfaces. Because of this, attaining a sufficient axial restraint of the probe commonly results in deformation of the probe beyond its yield at the clamped surfaces.

A welded collar is also a permanent part of this known probe coupling system. This collar cannot be field-installed on the probe. Additionally, the collar prevents adjustment of the insertion depth of the probe into a reaction vessel.

It can be understood from the foregoing description that an improved system and method of coupling a probe to a reaction vessel in a sealed manner would be desirable. Embodiments of the present invention overcome the deficiencies of known probe-to-vessel coupling systems and methods.

SUMMARY OF THE GENERAL INVENTIVE CONCEPT

The present invention is directed to an adapter for coupling a substantially cylindrical or tubular probe to a reaction vessel in a sealed manner. Adapters of the present invention overcome the deficiencies of known probe coupling techniques.

Adapter embodiments of the present invention include a cover plate that is securable to a mating portion of a reaction vessel. A body portion extends from the cover plate. A distal end of the body portion is threaded to engage with a corresponding threaded section of an adapter nut. An axial bore passes through the cover plate, body portion and adapter nut for allowing passage of a probe.

In one embodiment, a collet is located within a bore in the adapter nut such that a probe passes through the collet when passing through the adapter. The collet grips the exterior of the probe uniformly around its circumference. The collet is a thick walled tube that has conical faces at each end. The collet is cut axially in multiple places from each end to create spring fingers that allow the collet to constrict when subjected to an axial force, or to dilate when a probe of maximum size is placed through the collet bore.

A gripping force is generated via an inward compression of the spring fingers that results from an axial force applied reacting through its conical faces. Thus, the axial force is translated into a circumferential gripping pressure applied to the probe. The angle of the conical faces limits the gripping force exerted by the collet and allows the collet to be removed from the probe if desired.

The conical face of the proximal end of the collet is in contact with a first conical anvil that is slidably located within the axial bore in the cover plate body portion. The conical face of the distal end of the collet is in contact with a second conical anvil that is slidably located within the axial bore in the adapter nut. The anvils are tubular in nature such that that the probe passes through the anvils when passing through the adapter.

A sealing o-ring is located within a portion of the bore in the cover plate body portion to seal any gap between the outer surface of the probe and the adapter body portion. The o-ring resides between a bottom of the bore and a proximal end of the first conical anvil. Embodiments of a probe adapter of the present invention may also incorporate a load limiting feature in the form of one or a series (stack) of Belleville washers or other acceptable spring elements. The use of such spring elements provides a defined axial load to the collet by pressing against the distal end of the second conical anvil. The force generated by the spring elements may be selected to allow for tolerances of all of the components. The probe also passes through the o-ring and the spring elements when passing through the adapter.

If the reaction pressure increases while a probe is coupled to a reaction vessel by the adapter, the o-ring will apply an axially-directed force to the forward anvil. If the pressure increases so that the force exerted thereby is higher than the spring force exerted against the collet by the spring elements, the first anvil will move toward the adapter nut until the spring elements are fully compressed and bottom out. At this point the collet will increase its grip due to the resulting increase in the forces exerted against its conical faces by the anvils. The sealing o-ring will remain in a confined space and continue to function.

In another, simplified, exemplary embodiment, a collet is again located within a bore in an adapter nut such that a probe passes through the collet when passing through the adapter. As with the previously-described exemplary embodiment, the collet grips the exterior of the probe uniformly around its circumference and is again provided as a thick walled tube. However, the collet of this embodiment has conical faces at only one end. The collet tube is cut axially in multiple places at the conical end to create spring fingers that allow the collet to constrict when axial force is applied to the conical face, or to dilate when a probe of maximum size is placed through the collet bore.

A gripping force is again generated via an axial compression of the collet that results from a force applied to its conical face. The axial force is translated into a circumferential gripping pressure applied by the spring fingers at the conical end of the collet. The angle of the conical face limits the gripping force exerted by the collet and allows the collet to be removed from the probe if desired.

The non-conical face of the proximal end of the collet is in contact with a sealing o-ring that is located within an axial bore in the body portion. The conical face of the distal end of the collet is in contact with a conical anvil that is located within an axial bore in the adapter nut. The anvil is tubular in nature such that that the probe passes through the anvil when passing through the adapter.

The sealing o-ring seal any gap between the outer surface of the probe and the adapter body portion. Pressure within the reaction vessel to which the probe adapter is installed is exerted against the o-ring, which drives the conical end of the collet into the anvil and causes the collet to exert an additional gripping force on the probe. If the reaction pressure increases while a probe is coupled to a reaction vessel by the adapter, the o-ring will apply a greater axially-directed force to the proximal end of the anvil, which will cause the collet to increase its grip due to the resulting increase in the forces exerted against its conical face by the anvil. The sealing o-ring will remain in a confined space and continue to function.

Therefore, an adapter of the present invention is able to securely couple a probe to a reaction vessel in a sealed manner without causing a deformation of the probe. Further, an adapter of the present invention allows the depth of insertion of the probe into a reaction vessel to be adjusted, and also permits removal of the adapter from the probe when desired.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
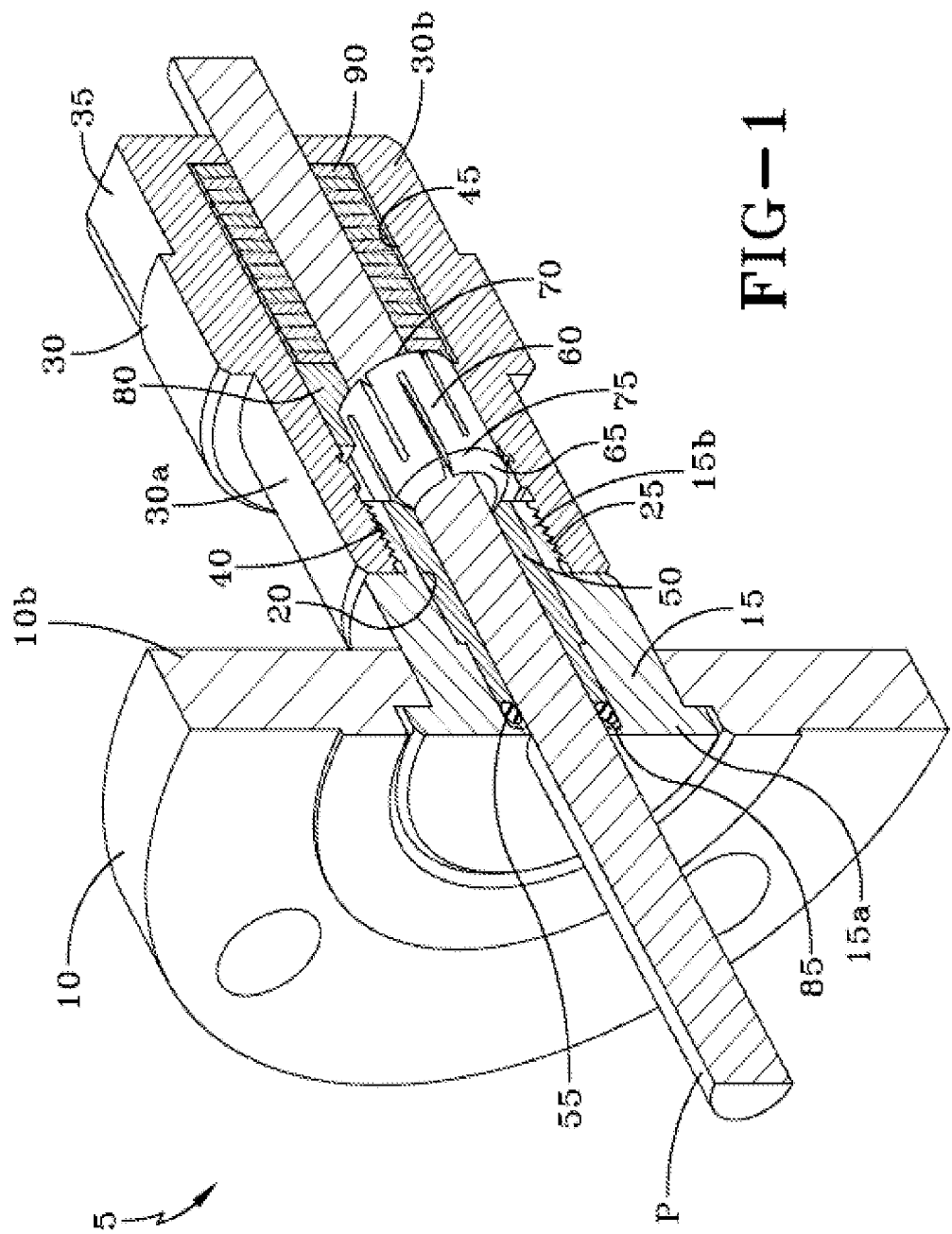
FIG. 1 is an isometric, partially cross-sectioned view of an exemplary probe adapter of the present invention removably coupled to an exemplary probe.
Figure 2:
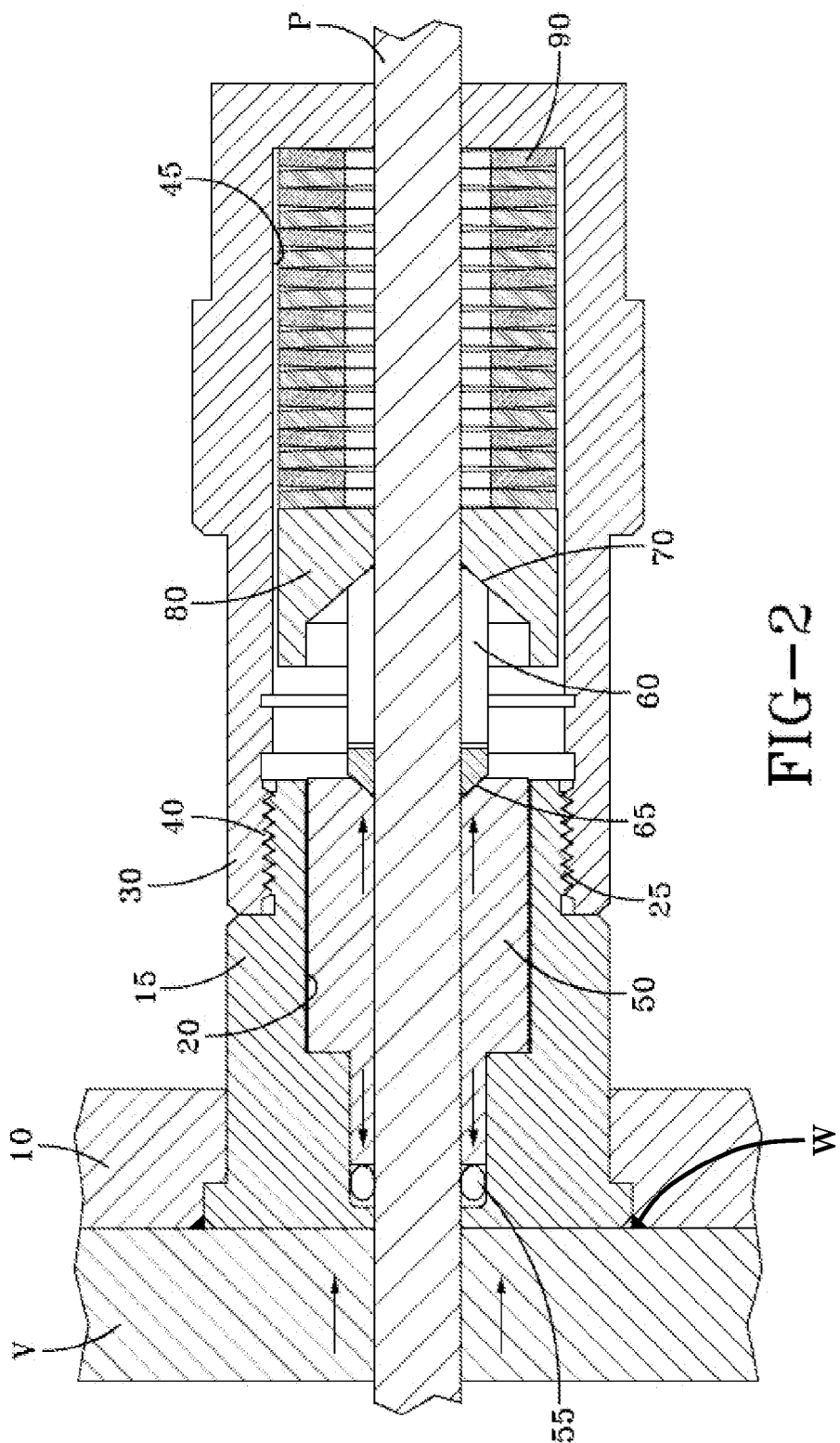
Figure 3:
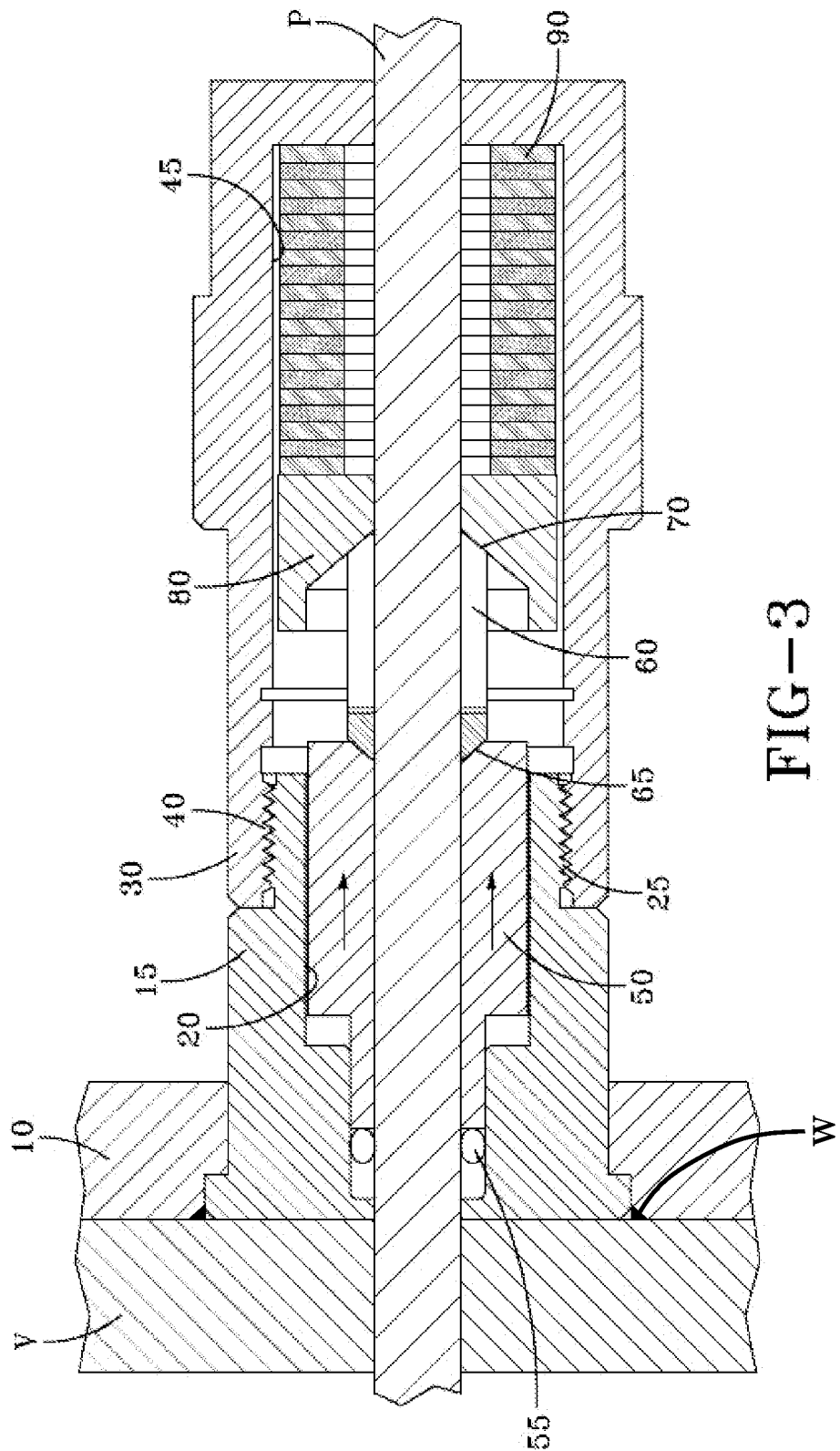
FIG. 3 depicts the adapter and probe of FIG. 2 after the pressure in the reactor vessel has increased.
Figure 4:
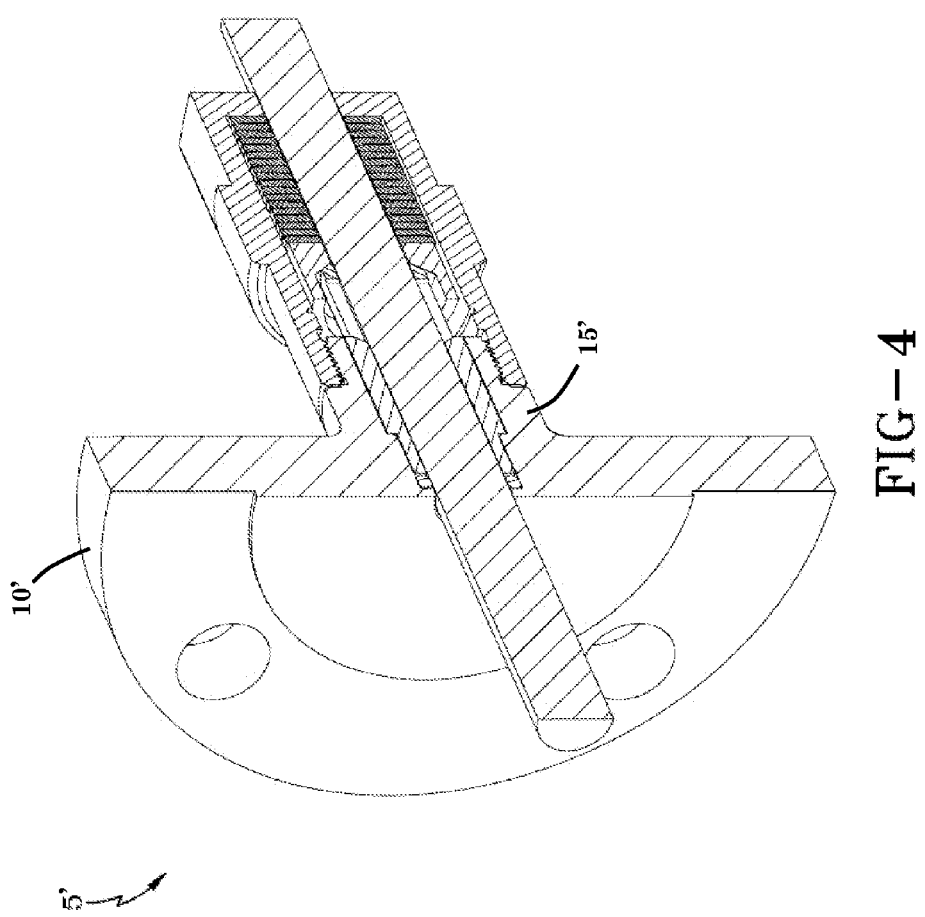
FIG. 4 depicts an alternative version of the probe adapter of FIGS. 1-3, wherein the body portion and the cover plate of the probe adapter are a unitary element.
Figure 5:
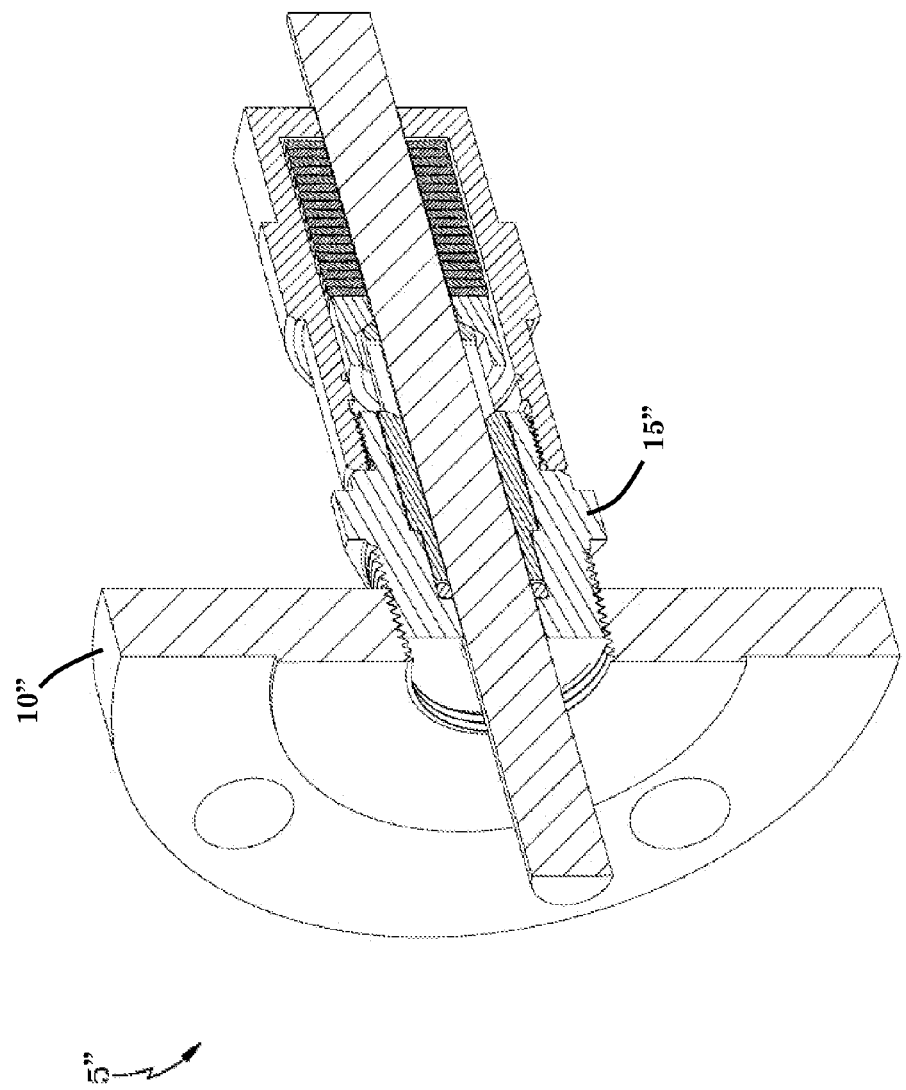
FIG. 5 depicts another alternative version of the probe adapter of FIGS. 1-3, wherein the body portion of the probe adapter is secured to the cover plate of the probe adapter by the engagement of corresponding threads.

One exemplary embodiment of a probe adapter 5 of the present invention is illustrated in FIGS. 1-3. As mentioned above, the adapter 5 includes a cover plate 10 that is securable to a mating portion of a reaction vessel V. An elongate body portion 15 extends from a distal side 10b of the cover plate 10. In this particular exemplary embodiment, the body portion 15 is a separate element that passes thru an opening in the cover plate 10 and is secured thereto by welding, as indicated by exemplary weld W in FIGS. 2 and 3. The body portion 15' and cover plate 10' of another probe adapter 5' may also be formed as a unitary element as indicated in FIG. 4, the body portion 15" may be secured to the cover plate 10" of a probe adapter 5" by the engagement of corresponding threads as indicated in FIG. 5, or another acceptable retention technique may be employed.

Referring again to FIGS. 1-3, an axial bore 20 is shown to extend through the body portion 15. In this particular exemplary embodiment, the bore 20 is stepped to allow for retention of a first conical anvil 50 and a sealing o-ring 55 (described in more detail below), and to allow a probe P to pass through the body portion 15 and cover plate 10. To this end, the diameter of each step of the bore 20 decreases as the bore moves from the distal end 15b of the body portion 15 toward a proximal portion 15a thereof. The diameter of the bore 20 where it exits the proximal end 15a of the body portion 15 is preferably only slightly greater than the outer diameter of the probe P.

The distal end 15b of the extending body portion 15 is threaded to engage with a correspondingly threaded section of a probe gripping portion which, in this exemplary embodiment, is in the form of an adapter nut 30. In this particular example, the distal end 15b of the extending body portion 15 is provided with male threads 25 to engage with corresponding female threads 40 located in a proximal end 30a of the adapter nut 30. A section of the distal end 15b of this exemplary extending body portion 15 is of a reduced diameter for this purpose, although this is not essential to the invention.

An elongate adapter nut 30 is provided to engage with the body portion 15 so as to form the overall body of the adapter 5. In this case, the adapter nut 30 has a stepped but substantially cylindrical exterior shape, although other shapes are also possible. Near the distal end 30b or at some other location along the adapter nut 30, flats 35 or other features may be provided to facilitate rotation of the adapter nut with a tool.

As described above, the proximal end 30a of the adapter nut 30 is provided with female threads 40 that correspond to and engage with the threads 25 located in a proximal end 30a adapter nut 30. The cover plate and body portion 10, 15 may thus be releasably secured to the adapter nut by engagement of the threads 25, 40 to form the overall body of the adapter 5.

An axial bore 45 passes through the adapter nut 30. The bore 45 in the adapter nut 30 is also stepped, with the diameter thereof being substantially uniform from the proximal end 30a of the adapter nut to a distance short of the distal end 30b. From this point through the exit of the bore 45 through the distal end 30b of the adapter nut, the diameter of the bore 45 is reduced to a dimension that is preferably only slightly greater than the outer diameter of the probe P.

A collet 60 having dual conical ends is located within the bore 45 in the adapter nut 30. The collet 60 grips the exterior of the probe uniformly around its circumference. The collet 60 is a thick walled tube that has conical faces 65, 70 at each end. The collet tube is cut axially in multiple places from each end to create a plurality of spring fingers 75 that allow the collet 60 to constrict when axial force is applied to the collet, or to dilate when a probe of maximum size is placed through the collet bore.

The conical face 65 of the proximal end of the collet 60 is in contact with the first conical anvil 50 that is slidably located within the axial bore 20 in the body portion 15. The conical face 70 of the distal end of the collet 60 is in contact with a second conical anvil 80 that is slidably located within the axial bore 45 in the adapter nut 30. The anvils 50, 80 are tubular in nature such that that the probe P passes through the anvils when passing through the adapter 5.

The sealing o-ring 55 is located along the bottom 85 of the bore 20 in the body portion 15 to seal any gap between the outer surface of the probe P and the bore in the body portion. The o-ring 55 proximally of the first conical anvil 50, such that pressure within a reactor vessel V to which the adapter 5 is coupled will exert a distally-directed force on the o-ring. This pressure on the o-ring 55 causes the o-ring to press against the first anvil 50 and the first anvil to press against the collet 60 which, as is described in more detail below, causes the collet to exert a gripping force on the probe P.

Embodiments of a probe adapter of the present invention may also incorporate a load limiting feature. For example, the exemplary probe adapter 5 described herein may include a load limiting feature in the form of one or a series (stack) of Belleville washers or other acceptable spring elements 90. The use of such spring elements provides a defined axial load on the collet 60 by pressing against the distal end of the second conical anvil 80. The force generated by the spring elements 90 may be selected to allow for tolerances of all of the components. The probe P also passes through the o-ring 55 and the spring elements 90 when passing through the adapter 5.

If the reaction pressure increases while a probe P is coupled to a reaction vessel V by the adapter 5, the o-ring 55 will apply an axially-directed force against the first (proximal) anvil 50. This causes the first anvil 50 to be distally displaced by some amount toward the collet 60. The o-ring 55 will nonetheless remain in a confined space within the bore 20 and continue to function.

If the pressure increases so that the force exerted by the o-ring 55 is higher than the spring force exerted against the collet 60 by the spring elements 90, the first anvil 55 will move toward the adapter nut 30 until the spring elements are fully compressed and bottom out (see FIG. 3). Compression of the spring elements 90 causes the spring elements to exert an increased axial force against the second conical anvil 80. Consequently, it can be understood that as the pressure within a reactor vessel V to which the adapter 5 is attached increases, the collet 60 is automatically caused to increase its grip on the probe P so that the probe remains securely retained by the adapter.

The gripping force exerted on the probe P by the collet 60 is generated via an axial force applied by contact with the anvils and reacting through the conical faces 65, 70 of the collet. The axial force is translated into a circumferential gripping pressure on the probe P through a resulting inward deflection of the spring fingers 75 at each end of the collet 60. The angle of the conical faces 65, 70 may be selected to limit the gripping force exerted by the collet 60 (spring fingers 75) so as not to damage or deform the probe P and/or to allow the collet to be removed from the probe if desired.

Figure 6:
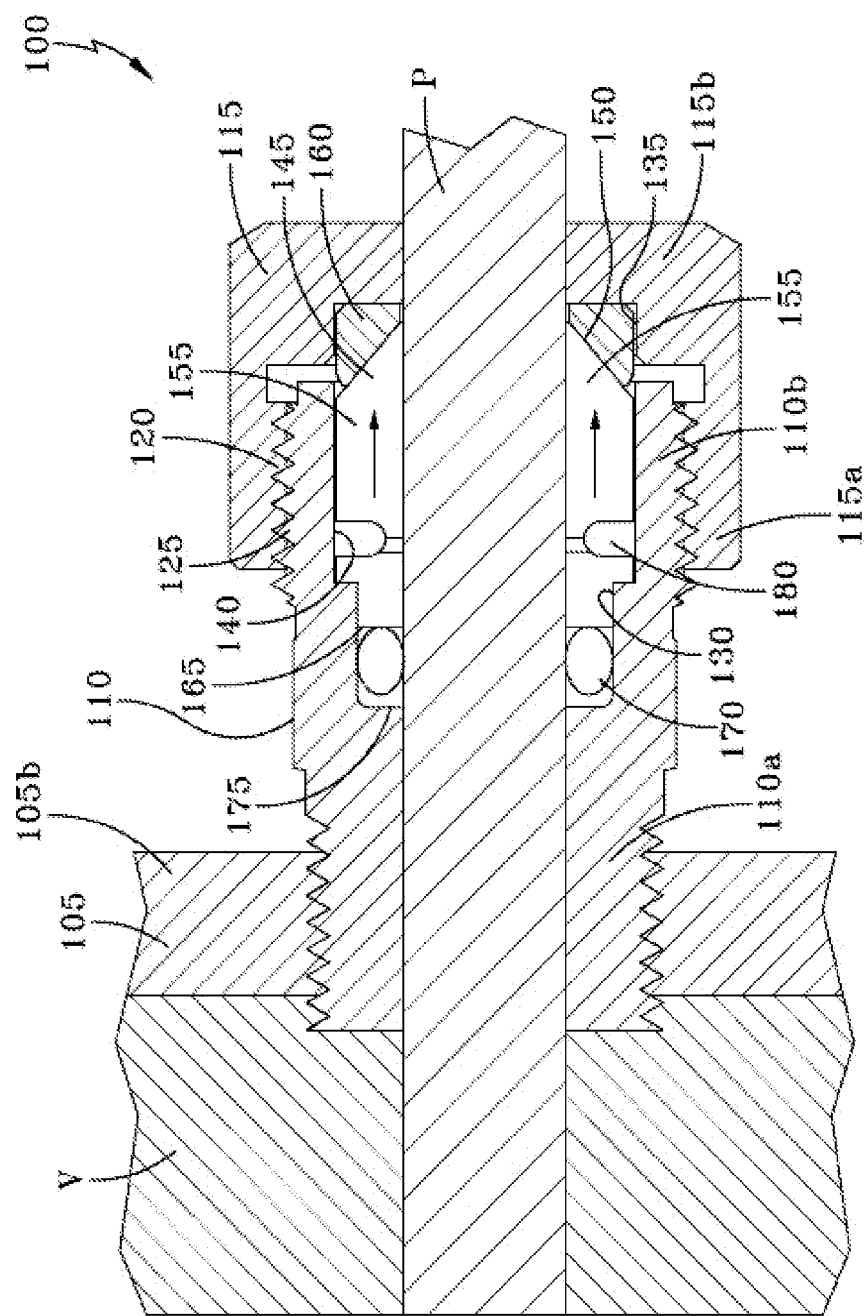
FIG. 6 illustrates an alternative exemplary probe adapter of the present invention being used to secure a probe to a reaction vessel.

An alternative embodiment of an exemplary probe adapter 100 is depicted in FIG. 6. As shown, the adapter 100 again includes a cover plate 105 that is securable to a mating portion of a reaction vessel V. An elongate body portion 110 extends from a distal side 105b of the cover plate 105. In this particular exemplary embodiment, the body portion 110 is a separate element that passes thru an opening in the cover plate 10 and is secured thereto by welding, by threaded engagement, or by another acceptable retention technique. In other embodiments, the body portion and the cover plate may be combined into a single element.

An axial bore 130 extends into the body portion 110 from the distal end 110b thereof, so as to form a cavity for receiving a collet 145 (see below). In this case, the bore 130 is stepped to form a hard stop against proximal movement of the collet 145 and to create an annular wall for retaining an o-ring 170. The diameter of the bore 130 where it exits the proximal end 110a of the body portion 110 is preferably only slightly greater than the outer diameter of the probe P.

The adapter 100 also includes an adapter nut 115 that is adapted for threaded engagement with the body portion 110. To this end, the proximal end 115a of the adapter nut 115 is provided with female threads 120 that correspond to and engage with threads 125 located along a distal end 110b of the body portion 110. The cover plate and body portion 105, 110 may be thus be releasably secured to the adapter nut 115 by engagement of the threads 120, 125 to form the overall body of the adapter 100.

An axial bore 135 also extends into the adapter nut 115 from the proximal end 115a thereof. The bore 135 in the adapter nut 115 is of substantially the same diameter as the bore 130 at the distal end 110a of the body portion 110, so as to form a cavity 140 for housing the collet 145. At the point where the bore 135 exits the distal 115b of the adapter nut 115, the diameter of the bore 135 is reduced to a dimension that is preferably only slightly greater than the outer diameter of the probe P.

A collet 145 is located within the cavity 140 formed by the engaged body portion 110 and adapter nut 115 such that a probe P passes through the collet 145 when passing through the adapter 100. As with the previously-described exemplary embodiment, the collet 145 grips the exterior of the probe uniformly around its circumference and is again provided as a thick walled tube. However, the collet of this embodiment has a conical face 150 at only one (distal) end. As described in regard to the exemplary embodiment of FIGS. 1-3, the collet tube is split axially in multiple places at the conical end to create spring fingers 155 that allow the collet to constrict when axial force is applied to the conical face, or to dilate when a probe of maximum size is placed through the collet bore. The collet 145 may include a circumferential annular groove 180 that acts to reduce the cross-sectional thickness of the spring fingers 155 so as to facilitate their compression against the probe P.

An anvil 160 resides at the bottom of the bore 135 in the adapter nut 115. The anvil 160 is provided with an angular proximal face that mates with the conical face 150 of the collet 145 when the two elements are in contact.

The non-conical face 165 at the proximal end of the collet 145 is in contact with a sealing o-ring 170 that is located along the bottom 175 of the axial bore 130 in the body portion 110 to seal any gap between the outer surface of the probe P and the bore in the body portion. The o-ring 170 is located proximally of the anvil 150, such that pressure within a reactor vessel V to which the adapter 100 is coupled will exert a distally-directed force on the o-ring.

When a distally-directed axial force is applied to the non-conical face 165 of the collet via the o-ring 170, the conical face 150 of the collet is driven against the anvil 160. The axial force reacts through the conical face 150 of the collet 145, causing a resulting compression of the spring fingers 155 and generating a gripping force on the probe P. The gripping pressure exerted on the probe P by the collet 145 will increase as pressure in the reactor vessel V increases and imparts a greater force against the o-ring 170. The angle of the conical face 150 may be selected to limit the maximum gripping force that can exerted by the collet 145 so as not to damage or deform the probe P and/or to allow the collet to be removed from the probe if desired.

While certain embodiments of the present invention are described in detail above, the scope of the invention is not to be considered limited by such disclosure, and modifications are possible without departing from the spirit of the invention as evidenced by the following claims:

What is claimed is:

1. An adapter for securing a probe to a reaction vessel, comprising:
   a reaction vessel cover plate that is securable to a mating portion of a reaction vessel, the cover plate having an elongate body portion extending therefrom;
   a probe gripping portion secured to a distal end of the body portion;
   a collet residing in a bore in the probe gripping portion, the collet having a split conical face at each end;
   a first anvil located in an axial bore in the body portion and proximally of the collet, the first anvil having a distal end adapted to engage a corresponding end of the collet;
   a second anvil located in the axial bore in the probe gripping portion distally of the collet, the second anvil having a proximal end adapted to engage a corresponding end of the collet; and
   an axial bore passing through the cover plate, elongate body, first anvil, collet, second anvil and probe gripping portion;
   wherein, a probe may be passed through the adapter within the axial bore; and
   wherein, the collet is adapted to exert a gripping force on the probe when subjected to an axial force applied by the first anvil, the axial force applied by the first anvil resulting from an axial pressing force that will be exerted against the first anvil as a result of pressure from within a reaction vessel when the adapter is in use.

2. The adapter of claim 1, further comprising an o-ring located in the bore in the body portion proximally of the first anvil, the o-ring positioned to surround a probe retained by the adapter.

3. The adapter of claim 2, wherein the o-ring is adapted to exert an axial pressing force against the first anvil when subjected to pressure from within a reaction vessel when the adapter is in use.

4. The adapter of claim 1, wherein the probe gripping portion is an adapter nut.

5. The adapter of claim 1, wherein the distal end of the first anvil and the proximal end of the second anvil are conically shaped to engage a corresponding conical face of the collet.

6. The adapter of claim 1, further comprising a load-limiting element.

7. The adapter of claim 6, wherein the load-limiting element is a spring element residing in the bore in the probe gripping portion distally of the second anvil.

8. The adapter of claim 7, wherein the spring element is at least one spring washer that exerts a predetermined axial load on the collet via the second conical anvil.

9. The adapter of claim 1, wherein the body portion is secured to the cover plate by a technique selected from the group consisting of the engagement of corresponding threads and welding.

10. The adapter of claim 1, wherein the gripping force exerted on the probe by the collet increases as the pressure within the reaction vessel to which the adapter is attached increases.

11. The adapter of claim 1, wherein the body portion and the cover plate are a unitary element.

12. The adapter of claim 1, wherein the conical face at each end of the collet is split into a plurality of gripping fingers.

13. An adapter for securing a probe to a reaction vessel, comprising:
   a cover plate having a first side adapted to be secured to a reaction vessel of interest and an axial bore for receiving and engaging an elongate body portion;
   an elongate body portion secured to and extending from an opposite side of the cover plate and having an axial bore passing therethrough;
   an adapter nut secured to a distal end of the body portion, the adapter nut having an axial bore passing therethrough;
   a collet residing in the bore in the adapter nut, the collet having an axial bore passing therethrough and a conical face at each end, the conical faces split into flexible gripping fingers;
   a first anvil located in the axial bore in the body portion proximally of the collet, the first anvil having an axial bore passing therethrough and a conical distal end adapted to engage a corresponding conical face of the collet;
   a second anvil located in the axial bore in the adapter nut distally of the collet, the second anvil having an axial bore passing therethrough and a conical proximal end adapted to engage a corresponding conical face of the collet; and
   an o-ring located in the bore in the body portion proximally of the first anvil, the o-ring positioned to surround a probe retained by the adapter;
   wherein, a probe may be passed through the axial bores in the cover plate, the elongate body, the first anvil, the collet, the second anvil and the adapter nut such that the probe passes axially through the adapter; and
   wherein, the collet is adapted to exert a gripping force on a probe passing through the adapter via the flexible gripping fingers at each end of the collet when the collet is subjected to an axial force applied by the first anvil, the axial force applied by the first anvil resulting from an axial pressing force that will be exerted against the first anvil by the o-ring as a result of pressure from within a reaction vessel when the adapter is in use.

14. The adapter of claim 13, further comprising a load-limiting element.

15. The adapter of claim 14, wherein the load-limiting element is a spring element residing in the bore in the adapter nut distally of the second anvil.

16. The adapter of claim 15, wherein the spring element is at least one spring washer that exerts a predetermined axial load on the collet via the second conical anvil.

17. The adapter of claim 13, wherein the body portion is secured to the cover plate by a technique selected from the group consisting of the engagement of corresponding threads and welding.

18. The adapter of claim 13, wherein the gripping force exerted on the probe by the collet increases as the pressure within the reaction vessel to which the adapter is attached increases.

19. The adapter of claim 13, wherein the body portion and the cover plate are a unitary element.

20. An adapter for securing a probe to a reaction vessel, comprising:
 a cover plate having a first side adapted to to be secured to a reaction vessel of interest and an axial bore for receiving and engaging a body portion;
 a body portion secured to and extending from an opposite side of the cover plate and having an axial bore passing therethrough;
 an adapter nut secured to a distal end of the body portion, the adapter nut having an axial bore passing therethrough;
 a collet residing in a cavity formed by the bore in the body portion and the adapter nut, the collet having an axial bore passing therethrough and a split conical face at a distal end thereof;
 an anvil located in the axial bore in the adapter nut distally of the collet, the anvil having an axial bore passing therethrough and a proximal face adapted to engage the conical distal end of the collet; and
 an o-ring located in the bore in the body portion proximally of the anvil, the o-ring positioned to surround a probe passing through the adapter;
 wherein, a probe may be passed through the axial bores in the cover plate, the body portion, the collet, the anvil and the adapter nut, and through the o-ring, such that the probe passes axially through the adapter; and
 wherein, the collet is adapted to exert a gripping force on a probe passing through the adapter when subjected to an axial force applied by the anvil, the axial force applied by the anvil resulting from an axial pressing force that will be exerted against a proximal face of the anvil by the o-ring as a result of pressure from within a reaction vessel when the adapter is in use.

21. The adapter of claim 20, wherein the body portion is secured to the cover plate by a technique selected from the group consisting of the engagement of corresponding threads and welding.

22. The adapter of claim 20, wherein the gripping force exerted on the probe by the collet increases as the pressure within the reaction vessel to which the adapter is attached increases.

23. The adapter of claim 20, wherein the body portion and the cover plate are a unitary element.

24. The adapter of claim 20, wherein the conical end of the collet is split axially in multiple places to create flexible spring fingers that constrict when an axial force is applied to the conical face.

25. The adapter of claim 20, wherein the anvil has a conical proximal face.

* * * * *

UNITED STATES PATENT AND TRADEMARK OFFICE
CERTIFICATE OF CORRECTION

PATENT NO. : 9,010,812 B2  
APPLICATION NO. : 13/414091  
DATED : April 21, 2015  
INVENTOR(S) : Blacklin It is certified that error appears in the above-identified patent and that said Letters Patent is hereby corrected as shown below:

In the Specification

In column 3, new line after line 67, please insert -- FIG. 2 is a side cross-sectional view showing the exemplary adapter and probe of FIG. 1 coupled to a pressurized reactor vessel; --

In the Claims

In column 9, line 19, please delete "adapted to to be" and insert -- adapted to be --.

Signed and Sealed this  
Eighteenth Day of August, 2015

Michelle K. Lee  
*Director of the United States Patent and Trademark Office*